US009761062B2

(12) United States Patent
Chen

(10) Patent No.: US 9,761,062 B2
(45) Date of Patent: Sep. 12, 2017

(54) METHOD AND APPARATUS FOR INDICATING AN AUTOMOTIVE DIAGNOSTIC URGENCY

(71) Applicant: Innova Electronics, Inc., Irvine, CA (US)

(72) Inventor: Ieon C. Chen, Laguna Hills, CA (US)

(73) Assignee: Innova Electronics Corporation, Irvine, CA (US)

(*) Notice: Subject to any disclaimer, the term of this patent is extended or adjusted under 35 U.S.C. 154(b) by 1 day.

(21) Appl. No.: 14/464,100

(22) Filed: Aug. 20, 2014

(65) Prior Publication Data

US 2016/0055684 A1 Feb. 25, 2016

Related U.S. Application Data

(63) Continuation-in-part of application No. 12/721,005, filed on Mar. 10, 2010, now Pat. No. 8,825,270.

(51) Int. Cl.

| | |
|---|---|
| ***G01M 17/00*** | (2006.01) |
| ***G06F 19/00*** | (2011.01) |
| ***G07C 5/00*** | (2006.01) |
| ***G07C 5/08*** | (2006.01) |

(52) U.S. Cl.

CPC ............. *G07C 5/006* (2013.01); *G07C 5/008* (2013.01); *G07C 5/0808* (2013.01); *G07C 5/0816* (2013.01); *G07C 2205/02* (2013.01)

(58) Field of Classification Search

CPC .... G07C 5/006; G07C 5/0808; G07C 5/0816; G07C 5/008

See application file for complete search history.

(56) References Cited

U.S. PATENT DOCUMENTS

| | | | |
|---|---|---|---|
| D334,560 | S | 4/1993 | Wilson |
| 5,347,211 | A | 9/1994 | Jakubowski |
| D377,622 | S | 1/1997 | Chen |
| 5,635,841 | A | 6/1997 | Taylor |
| 5,758,300 | A | 5/1998 | Abe |
| 5,767,681 | A | 6/1998 | Huang |
| 5,809,437 | A | 9/1998 | Breed |
| 5,859,628 | A | 1/1999 | Ross et al. |
| 5,884,202 | A | 3/1999 | Arjomand |
| 6,000,413 | A | 12/1999 | Chen |
| 6,055,468 | A | 4/2000 | Kaman et al. |
| 6,094,609 | A | 7/2000 | Arjomand |
| 6,169,943 | B1 | 1/2001 | Simon et al. |
| 6,225,898 | B1 | 5/2001 | Kamiya et al. |
| 6,263,268 | B1 | 7/2001 | Nathanson |
| 6,389,337 | B1 | 5/2002 | Kolls |

(Continued)

FOREIGN PATENT DOCUMENTS

| | | |
|---|---|---|
| WO | WO 0186576 | 11/2001 |

*Primary Examiner* — Adam Tissot

(74) *Attorney, Agent, or Firm* — Stetina Brunda Garred and Brucker

(57) ABSTRACT

Provided is a method for determining the urgency for repairing a diagnostic condition in a vehicle. Upon determining the repair urgency, a driver may decide to continue driving (in the case of a "low" urgency determination), or cease driving (in the case of a "high" urgency determination). The urgency status may also enable a driver to shop around for the repair (in the event of a "low" urgency status), or to seek immediate assistance (in the event of a "high" urgency status).

16 Claims, 6 Drawing Sheets

(56) References Cited

U.S. PATENT DOCUMENTS

| | | | |
|---|---|---|---|
| 6,438,471 | B1 | 8/2002 | Katagishi et al. |
| 6,499,385 | B2 | 12/2002 | Protti |
| 6,535,112 | B1 | 3/2003 | Rothschink |
| 6,587,768 | B2 | 7/2003 | Chene et al. |
| 6,611,740 | B2 | 8/2003 | Lowrey et al. |
| 6,650,318 | B1 | 11/2003 | Arnon |
| 6,718,425 | B1 | 4/2004 | Pajakowski et al. |
| 6,732,031 | B1 | 5/2004 | Lightner et al. |
| 6,807,469 | B2 | 10/2004 | Funkhouser et al. |
| 6,836,708 | B2 | 12/2004 | Tripathi |
| 6,847,916 | B1 | 1/2005 | Ying |
| 6,868,369 | B2 | 3/2005 | Huang |
| 6,925,368 | B2 | 8/2005 | Funkhouser et al. |
| 6,940,270 | B2 | 9/2005 | Chen |
| D510,287 | S | 10/2005 | Chen |
| 6,957,133 | B1 | 10/2005 | Hunt et al. |
| 6,968,733 | B2 | 11/2005 | Andreasen |
| 7,030,742 | B2 | 4/2006 | Treadway |
| 7,085,680 | B2 | 8/2006 | Huang |
| 7,116,216 | B2 | 10/2006 | Andreasen |
| 7,209,813 | B2 | 4/2007 | Namaky |
| RE39,619 | E | 5/2007 | Andreasen |
| D545,223 | S | 6/2007 | Chen |
| D558,621 | S | 1/2008 | Rich |
| D559,137 | S | 1/2008 | Protti |
| D560,129 | S | 1/2008 | Rich |
| D560,527 | S | 1/2008 | Rich |
| 7,325,775 | B2 | 2/2008 | Chen |
| D563,249 | S | 3/2008 | Chen |
| 7,363,149 | B2 | 4/2008 | Klausner et al. |
| D569,280 | S | 5/2008 | Chen |
| 7,376,497 | B2 | 5/2008 | Chen |
| D571,241 | S | 6/2008 | Andreasen |
| 7,437,227 | B2 | 10/2008 | Andreasen |
| D581,822 | S | 12/2008 | Madison |
| 7,464,000 | B2 | 12/2008 | Huang |
| D590,387 | S | 4/2009 | Chen |
| 7,520,668 | B2 | 4/2009 | Chen |
| RE40,798 | E | 6/2009 | Chen |
| RE40,799 | E | 6/2009 | Chen |
| 7,603,293 | B2 | 10/2009 | Chen |
| D610,586 | S | 2/2010 | Chen |
| 7,734,390 | B2 | 6/2010 | Chen |
| 7,778,750 | B2 | 8/2010 | Knight et al. |
| D624,446 | S | 9/2010 | Chen |
| D624,838 | S | 10/2010 | Chen |
| D625,209 | S | 10/2010 | Chen |
| D625,210 | S | 10/2010 | Chen |
| D625,634 | S | 10/2010 | Chen |
| 7,904,219 | B1 | 3/2011 | Lowrey et al. |
| 7,974,750 | B2 | 7/2011 | Namaky |
| 8,019,503 | B2 | 9/2011 | Andreasen |
| 8,024,083 | B2 | 9/2011 | Chen |
| D646,188 | S | 10/2011 | Chen |
| D646,599 | S | 10/2011 | Chen |
| 8,032,419 | B2 | 10/2011 | Chen |
| 8,068,951 | B2 | 11/2011 | Chen et al. |
| 8,301,329 | B2 | 10/2012 | Andreasen |
| 8,306,687 | B2 | 11/2012 | Chen |
| 8,370,018 | B2 | 2/2013 | Andreasen et al. |
| 8,509,986 | B1 | 8/2013 | Chen |
| 8,630,765 | B2 | 1/2014 | Chen |
| 8,825,271 | B2 | 9/2014 | Chen |
| 8,831,814 | B2 | 9/2014 | Chen |
| 8,855,621 | B2 | 10/2014 | Chen |
| 8,862,117 | B2 | 10/2014 | Chen |
| 8,880,274 | B2 | 11/2014 | Chen |
| 2003/0055666 | A1* | 3/2003 | Roddy ................ B61L 27/0094 705/305 |
| 2003/0138475 | A1* | 7/2003 | Chen ....................... C05F 11/08 424/435 |
| 2003/0171111 | A1 | 9/2003 | Clark |
| 2004/0110472 | A1 | 6/2004 | Witkowski |
| 2009/0055045 | A1* | 2/2009 | Biswas ................ G07C 5/0808 701/31.4 |
| 2009/0276115 | A1 | 11/2009 | Chen |
| 2011/0224866 | A1 | 9/2011 | Chen |
| 2011/0264322 | A1 | 10/2011 | Chen |
| 2012/0215398 | A1 | 8/2012 | Chen |
| 2014/0046800 | A1 | 2/2014 | Chen |
| 2014/0052328 | A1 | 2/2014 | Nguyen |
| 2014/0074865 | A1* | 3/2014 | Zobrist .................. G06Q 10/06 707/749 |

* cited by examiner

FIRST ORDER DIAGNOSTICS

RECEIVE TROUBLE CODES

↓

MATCH EACH TROUBLE CODE WITH A DIAGNOSTIC URGENCY

SECOND ORDER DIAGNOSTICS

RECEIVE TROUBLE CODES

↓

ARRANGE TROUBLE CODES INTO GROUPS OF CODES

↓

MATCH EACH GROUP WITH A DIAGNOSTIC URGENCY

METHOD AND APPARATUS FOR INDICATING AN AUTOMOTIVE DIAGNOSTIC URGENCY

CROSS-REFERENCE TO RELATED APPLICATIONS

The present application is a continuation-in-part patent application of U.S. patent application Ser. No. 12/721,005, filed Mar. 10, 2010, the contents of which are expressly incorporated herein by reference.

STATEMENT RE: FEDERALLY SPONSORED RESEARCH/DEVELOPMENT

Not Applicable

BACKGROUND

The present disclosure is related generally to automotive diagnostics, and more specifically to a method and system of determining the urgency of repairing a diagnostic condition.

Today's vehicles are generally complex electro-mechanical systems which tend to breakdown over time. One or more of the vehicle's sub-systems may begin to operate outside of normal operating parameters, which may cause a vehicle diagnostic condition. The vehicle diagnostic conditions may affect the vehicle's performance, or may ultimately cause the vehicle to cease operation. Therefore, it is important to detect the vehicle diagnostic conditions in order to maintain the vehicle in a safe and efficient operating condition.

Most vehicles include a basic diagnostic indicator to alert the driver of the presence of a diagnostic condition. This basic diagnostic indicator may be located on the dashboard, or another readily observable position from the driver's seat. In most vehicles, the basic diagnostic indicator is a "check engine" light, which illuminates when a diagnostic condition arises. Although the basic diagnostic indicator is useful in alerting the driver of a vehicle diagnostic condition, it typically does not identify the particular vehicle diagnostic condition. Rather, the driver is merely notified that there may be a problem with the vehicle.

In order to obtain a more comprehensive diagnostic analysis of the vehicle, it may be necessary to download information from the vehicle's onboard computer. The onboard computer is generally in communication with the vehicle's various sub-systems to obtain data from the sub-systems. Most sub-systems generate diagnostic trouble codes when a diagnostic condition arises. Each diagnostic trouble code may be associated with a specific diagnostic condition, and once the diagnostic trouble codes are triggered, they may be stored on the vehicle's onboard computer and downloaded therefrom by an automotive scan tool for diagnostic analysis. For a comprehensive diagnostic analysis, the diagnostic trouble codes are uploaded to a diagnostic database having a plurality of diagnostic trouble codes and their associated diagnostic condition. The vehicle may be repair upon identifying the diagnostic condition plaguing the vehicle.

However, the urgency of completing the repair may not be the same for all diagnostic conditions. In particular, the same diagnostic condition may be more urgent in some vehicles, and less urgent in others. For instance, a loose or disconnected gas cap may trigger a diagnostic trouble code, yet may not require immediate attention. Conversely, a malfunction related to the air bag system may also trigger a diagnostic trouble code, and require immediate attention. Still further, a problem with the vehicle's balance bar may trigger a diagnostic trouble code, and be a more urgent condition in an SUV (which is more susceptible to a roll over), and a less urgent condition in a sedan.

A basic urgency indicator (as discussed above) may not provide the driver with an indication as to the urgency of addressing the problem with the vehicle. Furthermore, conventional automotive scan tools may receive the diagnostic trouble codes triggered by the vehicle, to allow the user to identify the vehicle's diagnostic condition(s); however, such conventional automotive scan tools typically do not alert the user as to the urgency of fixing the diagnostic condition(s).

In view of the foregoing, there is a need in the art for an automotive diagnostic device which advantageously communicates the urgency related to fixing a vehicle's diagnostic condition.

BRIEF SUMMARY

Provided is a method for determining the urgency associated with repairing a diagnostic condition in a vehicle. Upon determining the repair urgency, a driver may decide to continue driving (in the case of a "low" urgency determination), or cease driving (in the case of a "high" urgency determination). The urgency status may also enable a driver to shop around for the repair (in the event of a "low" urgency status), or to seek immediate assistance (in the event of a "high" urgency status).

One embodiment includes a method of identifying the urgency of treating a diagnostic condition of a vehicle. The method includes forming a first urgency database and a second urgency database. The first urgency database includes a plurality of diagnostic trouble codes, wherein each diagnostic trouble code is associated with a respective first urgency status. The first urgency status is one of a low urgency and a high urgency. The second urgency database includes a plurality of combinations of diagnostic trouble codes, wherein each combination of diagnostic trouble codes is associated with a respective second urgency status. The second urgency status is one of a low urgency and a high urgency. The diagnostic trouble codes are received at the first urgency database to determine the first urgency status. The diagnostic trouble codes are also received at the second urgency database to determine the second urgency status. An overall diagnostic urgency is determined, with the diagnostic urgency being one of a high diagnostic urgency and a low diagnostic urgency. The diagnostic urgency is the high diagnostic urgency when at least one of the first urgency status and the second urgency status is high urgency. The diagnostic urgency is the low diagnostic urgency when the first urgency status and the second urgency status are both low urgency.

The first urgency status may be dependent upon a vehicle characteristic defined by the vehicle. The method may also include the steps of determining the vehicle characteristic and receiving the vehicle characteristic at the first urgency database and/or the second urgency database. The vehicle characteristic may include the vehicle identification number, which may be decoded to determine further information pertaining to the vehicle.

Another embodiment includes a diagnostic urgency tool for determining an urgency associated with a diagnostic condition of a vehicle, wherein the vehicle includes an onboard computer for storing trouble codes. The diagnostic urgency tool includes a tool connector connectable to the onboard computer to download the trouble codes. A first urgency database is in operative communication with the urgency detection tool, and is configured to determine a first urgency status associated with each trouble code. The first urgency status is either a low urgency or a high urgency. An urgency indicator is in communication with the first urgency database and is configured to activate an urgency signal corresponding to a diagnostic urgency.

The diagnostic urgency tool may include a second urgency database to arrange the plurality of trouble codes into a combination of trouble codes, and to determine a second urgency status for each combination of trouble codes. The second urgency is either a low urgency or a high urgency.

According to another embodiment, there is provided a method of identifying an urgency of treating a diagnostic condition of a vehicle, wherein the vehicle includes an on-board computer having a diagnostic data and vehicle identification information stored thereon. The method comprises identifying a most likely solution based on the diagnostic data retrieved from a vehicle, and identifying a repair part associated with the most likely solution, wherein the identified repair part is associated with a universal part number. The method further includes providing an urgency database having a plurality of universal part numbers, wherein each universal part number is associated with a one of a low urgency and a high urgency. The universal part number associated with the repair part is compared to information stored in the first urgency database to determine an urgency status associated with the repair part. A high urgency indicator signal is generated in response to a high urgency status resulting from comparison of the universal part number to the urgency database.

The urgency database may include a plurality of Aftermarket Catalog Enhanced Standard (ACES) part numbers associated with one of the low urgency and the high urgency.

The step of identifying a repair part may include an assessment of the vehicle identification information.

The method may further comprise the step of shipping the repair part when the repair part is associated with a prescribed urgency, such as a high urgency. The method may additionally include the step of scheduling a repair when the repair part is associated with a prescribed urgency. The method may also include the step of generating a sale of the repair part when the repair part is associated with a prescribed urgency.

The method may further comprise the step of providing an urgency indicator configured to emit a high urgency alert signal in response to generation of the high urgency indicator signal.

The method may also include generating a low urgency indicator signal in response to a low urgency status resulting from comparison of the universal part number to the urgency database.

According to another aspect of the invention, there is provided a diagnostic urgency system for determining an urgency associated with a diagnostic condition of a vehicle having an onboard computer for storing diagnostic data and vehicle identification information. The diagnostic urgency system includes a tool connectable with the onboard computer to download the diagnostic data and vehicle identification information from the onboard computer. A solution database is in operative communication with the tool, wherein the solution database includes most likely solutions associated with diagnostic data, and at least one most likely solution is associated with a repair part. A repair parts database is in operative communication with the solution database, and includes repair parts associated with universal part numbers and vehicle identification information. A first urgency database is in operative communication with the repair parts database and includes a listing of universal part numbers associated with a high urgency status. An urgency indicator is in communication with the first urgency database and is configured to activate a high urgency signal in response to matching universal part numbers with diagnostic trouble codes listed in the first urgency database.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figures 1, 2, 3:
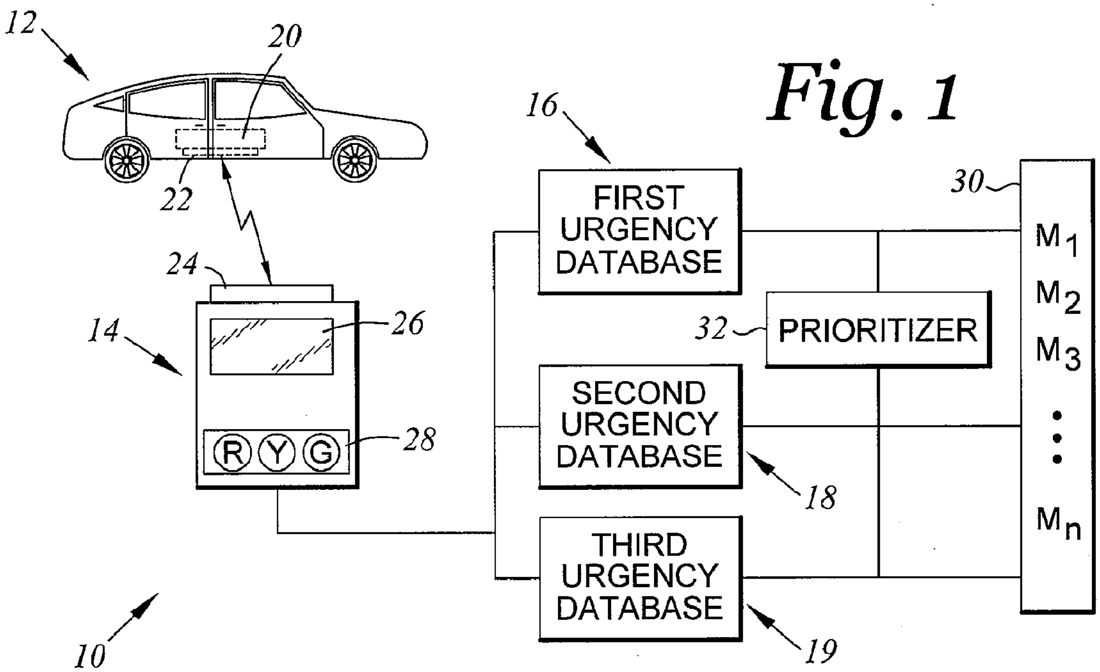
FIG. 1 is a schematic view of a diagnostic urgency detection system.
FIG. 2 is a flow chart for performing first order diagnostics.
FIG. 3 is a flow chart for performing second order diagnostics.
Figure 4:
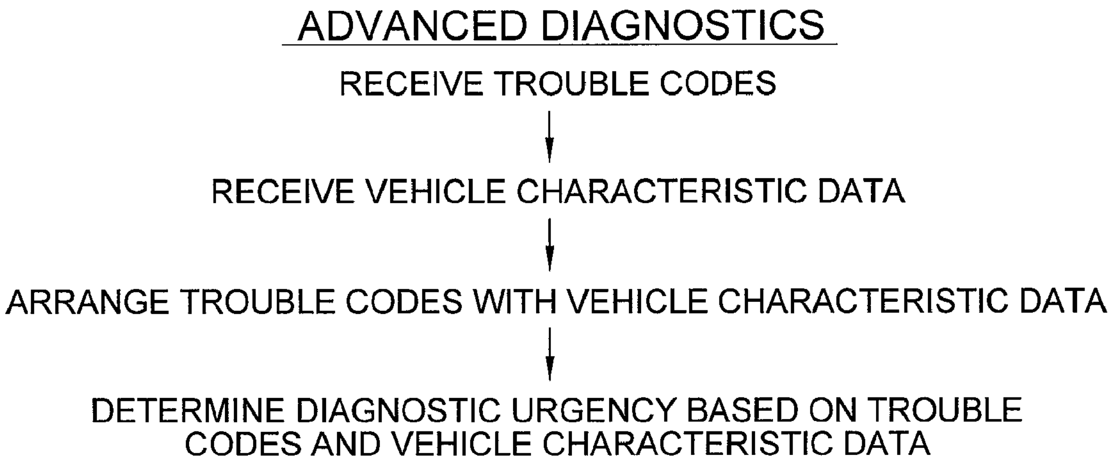
FIG. 4 is a flow chart for performing advanced diagnostics.

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Referring now to the drawings, where the showings are for purposes of illustrating an embodiment of the present disclosure, and not for purposes of limiting the same, there is shown a system for determining the urgency of an automotive diagnostic condition. The system allows a user to download diagnostic data from a vehicle and analyze the data to determine the urgency related to a vehicle's diagnostic condition. This provides the user with a means of determining whether the diagnostic condition should be addressed immediately, or whether the diagnostic condition can be addressed at a later time. The urgency indicator system is a safety feature for a driver, who may assume that there is nothing wrong with his vehicle. In this respect, the urgency indicator system may alert the driver of a problem which the driver may not be aware of. The diagnostic urgency system may also provide an economic benefit to a driver who assumes the diagnostic condition must be fixed immediately (i.e., at a premium), rather than shopping around for a better deal. In addition, the diagnostic urgency system may provide convenience for a driver by informing the driver that the diagnostic condition may be fixed at a more convenient time, or alternatively that the vehicle should be fixed immediately to avoid an inconvenient breakdown.

Referring now specifically to FIG. 1, which provides a system level overview of the diagnostic urgency system 10, there is shown a vehicle 12, an urgency indicator tool or device 14, a first urgency database 16, a second urgency database 18, and a third urgency database 19. The vehicle 12 includes an on-board computer 20, which is in communication with the various systems and components comprising the vehicle 12. The on-board computer 20 may generate and/or store data during the operation of the vehicle 12. A portion of that data may be diagnostic data which relates to the health and operability of the vehicle 12. The diagnostic data may include one or more diagnostic trouble codes, which are common to OBD-II compliant vehicles. The discussion below pertains to analysis of diagnostic trouble codes for purposes of determining the urgency of a diagnostic condition; however, it is understood that other diagnostic data may also be used and analyzed in other embodiments of the urgency detection system 10.

The urgency detection tool 14 may be placed in communication with the on-board computer 20 to download the diagnostic trouble codes therefrom. The on-board computer 20 includes a computer connector 22 which interfaces with the urgency detection tool 14. Likewise, the urgency detection tool 14 includes a tool connector 24 which interfaces with the on-board computer 20. In this manner, the computer connector 22 may interface directly with the tool connector 24. The communication between the on-board computer 20 and the urgency detection tool 14 may be by way of wireless communication (i.e. BLUETOOTH), or wired communication (i.e. physical connection between the computer connector 22 and the tool connector 24, or the use of an intermediate cable). Once the urgency detection tool 14 is connected to the on-board computer 20, the diagnostic trouble codes may be downloaded from the on-board computer 20 to the urgency detection tool 14. It is contemplated that the downloading of the diagnostic trouble codes may take place on a real time basis (i.e., during operation of the vehicle) or from data stored on the on-board computer 20 from previous operation of the vehicle 12.

The urgency detection tool 14 may include an internal memory (i.e. flash memory) to store the diagnostic trouble codes downloaded from the on-board computer 20. A display screen 26 may also be included on the urgency detection tool 14 to display data to a user, such as the particular trouble codes received from the vehicle 12, or information related to the diagnostic urgency. The urgency detection tool 14 may further includes a diagnostic indicator 28 to indicate the urgency associated with the diagnostic trouble codes received from the vehicle 12. As explained in more detail below, the urgency may be classified as “high” (for example, a red LED) or “low” (for example, a green LED). In some embodiments, a “medium” (for example, a yellow LED) diagnostic urgency may also be determined.

According to one embodiment, the diagnostic urgency is determined by comparing the diagnostic trouble codes with information in one or more urgency databases. In the system 10 depicted in FIG. 1, three databases 16, 18, 19 are used to determine the diagnostic urgency of the vehicle 12; although, those skilled in the art will appreciate that fewer than three urgency databases, or more than three urgency databases may be used without departing from the spirit and scope of the present disclosure.

The first urgency database 16, second urgency database 18, and third urgency database 19 are disposed in operative communication with the urgency detection tool 14. According to one embodiment, the databases 16, 18, 19 are located at a remote location and may be accessed by the urgency detection tool 14 via a network, such as the Internet. In this respect, the urgency detection tool 14 may upload the diagnostic trouble codes to an intermediate device (not shown), such as a computer or cellphone, for further communication to the databases 16, 18. For more information related to using a cellphone for communications between the urgency detection tool 14 and a remote database, please see U.S. Patent Application Publication No. 2007/0005201, entitled Cellphone Based Vehicle Diagnostic System, the contents of which are expressly incorporated herein by reference. Alternatively, the urgency detection tool 14 may have wireless communication means (not shown) integrated therein to facilitate communication to the remote databases 16, 18, 19.

According to another embodiment, the databases 16, 18, 19 may be internal to the urgency detection tool 14. In this regard, the tool 14 may have an internal memory to provide a storage capacity for storing the databases 16, 18, 19. The data included in the databases 14, 16, 19 may be stored on the tool 14 before the tool 14 is sold. In this manner, the databases 14, 16, 19 may be configured for use with a wide range of vehicles. Data compression techniques known in the art may be used to store the large amount of data that may be included in the databases 16, 18, 19. Alternatively, the databases 16, 18, 19 may be specifically configured for use with a particular vehicle or a group of vehicles. For instance, the databases 16, 18, 19 may have information related to a specific vehicle manufacturer, or for vehicles manufactured within a specific time period (i.e., range of years).

It is also contemplated that the databases 16, 18, 19 may be downloaded onto the tool 14 after purchase by a user. In one embodiment, the tool 14 may access a network to download the information for the databases 16, 18, 19. For instance, the tool 14 may be disposed in communication with a PC (i.e., via a USB cable) or cellphone to access the information over the Internet, or CD-ROM sold with the tool 14. The tool 14 may also have the capability to communicate directly with the Internet to download the information. The tool 14 may also download updates to the databases 16, 18.

According to one embodiment, and referring now to FIG. 2, the first urgency database 16 is configured to perform first order diagnostics. In this respect, the first urgency database 16 is configured to map each diagnostic trouble code received from the vehicle 12 to a respective urgency status. Thus, each trouble code downloaded from the vehicle 12 is analyzed by the first urgency database 16 to identify the urgency status associated with the respective trouble code. Therefore, if multiple trouble codes are received from the vehicle 12, the first urgency database 16 will generate multiple urgency statuses.

The architecture of the first urgency database may have many different forms. For instance, it is contemplated that the first urgency database 16 may include a listing of diagnostic trouble codes associated with a high urgency status, as well as trouble codes associated with a low urgency status.

Alternatively, the first urgency database 16 may only include diagnostic trouble codes associated with the high urgency status. In this respect, trouble codes received from the vehicle may be compared with the codes in the first urgency database. If none of the trouble codes downloaded from the vehicle 12 match with any of the codes found in the first urgency database 16, then the urgency status is low. Conversely, if at least one of the codes downloaded from the vehicle matches with the codes found in the first urgency database 16, then the urgency status is high.

It is additionally contemplated that the first urgency database 16 may only include a listing a trouble codes associated with low urgency status. Therefore, if some of the codes downloaded from the vehicle 12 are not found on the first urgency database 16, then the urgency status is high. However, if all of the codes downloaded from the vehicle 12 are listed in the first urgency database 16, then the urgency status is low.

Referring now to FIG. 3, the second urgency database 18 is configured to perform second order diagnostics. The second urgency database 18 performs second order diagnostics by determining an urgency status for combinations of trouble codes. For instance, if trouble codes 101, 102, and 103 are received from the vehicle 12, the second urgency database 18 will determine an urgency status for all the combinations of trouble codes. In particular, an urgency status will be determined for the combination of codes 101 and 102, the combination of codes 101 and 103, the combination of codes 102 and 103, and finally, the combination of all the codes, 101, 102, and 103. In this regard, the second urgency database 18 may be configured to group the trouble codes into the various permutations of codes.

The architecture of the second urgency database 18 may be varied, similar to the first urgency database 16 discussed above. For instance, the second urgency database 18 may provide an urgency status for each combination of trouble codes. Alternatively, the second urgency database may only list combinations of trouble codes associated with a high urgency status or a low urgency status.

The second urgency database 18 may have sophisticated searching and matching capabilities. For instance, it may be desirable to focus the search to groups containing a particular trouble code (i.e., all combinations including the code 101). In this respect, the second urgency database may determine the urgency status for all groups including the 101 trouble code. The second urgency database 18 may also focus the search to groups containing a combination of trouble codes (i.e., all combinations including the combination of codes 101 and 102). As such, the second urgency database 18 may tailor the search to determine the urgency status for all groups include the 101 and 102 trouble codes.

The foregoing discusses organizing the first and second databases 16, 18 by urgencies associated with single codes (i.e., the first urgency database 16) or urgencies associated with groupings of codes (i.e., the second urgency database 18). However, it is also contemplated that the databases may be arranged by the urgency associated with the code(s). For instance, the first urgency database 16 may include code(s) associated with a low urgency, the second urgency database 18 may include codes associated with a medium urgency, and the third urgency database 19 may include codes associated with a medium urgency.

According to another embodiment, the system 10 may be configured to determine the urgency status as a function of certain vehicle characteristics, in addition to an analysis of the diagnostic trouble codes. A single trouble code may be associated with a "high" urgency status for one vehicle and a "low" urgency status for another vehicle. For instance, a diagnostic trouble code pertaining to a vehicle's balance bar may be highly urgent for a tall vehicle, and not as urgent for a shorter vehicle. Therefore, the urgency detection tool 14 may also be able to obtain vehicle characteristic data from the vehicle 12. The vehicle characteristic data may be downloaded by the urgency detection tool 14 from the onboard computer 20. Alternatively, the user may be asked to enter vehicle characteristic data into the urgency detection tool 14.

The vehicle characteristic data may include the vehicle identification number (VIN) which may be decoded to determine the year, manufacturer, make, and model of the vehicle. For more information about downloading and decoding the VIN number, please refer to U.S. patent application Ser. No. 12/501,698, entitled Handheld Automotive Diagnostic Tool with VIN Decoder, owned by Innova Electronic Corporation of Fountain Valley, Calif., the assignee of the present patent application. The capability of determining the urgency status based on vehicle characteristics allows the system 10 and the urgency detection tool 14 to be used in a universal capacity. Therefore, if a family owns two vehicles, the urgency detection tool 14 may be used on both vehicles.

It is contemplated that the first and/or second databases 16, 18 may be configured to compare trouble codes based on certain vehicle characteristics. For instance, the databases 16, 18 may have separate "pages" arranged by certain vehicle characteristics (i.e., an SUV "page", a four-wheel drive "page", a "page" for vehicles manufactured in a certain year, etc.). In this respect, the databases 16, 18 would first determine which "page" to look at based on the vehicle being tested. Then, the databases 16, 18 would compare the trouble codes received from the vehicle 12 with the codes on that particular "page."

Figure 5:
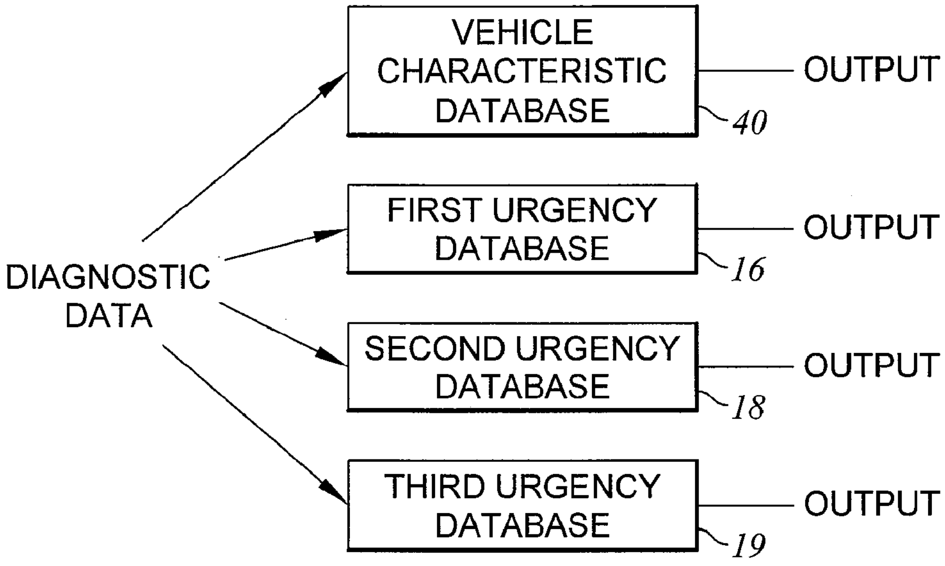
FIG. 5 is a schematic view of a system having a vehicle characteristic database, a first urgency database, and a second urgency database.

Referring now to FIG. 5, another embodiment of the system 10 may include a separate vehicle characteristic database 40 for determining the urgency status based upon one or more vehicle characteristics. In this respect, the vehicle characteristic database 40 may include a listing of codes classified by a respective vehicle characteristic. For instance, the vehicle characteristic database 40 may include a listing of trouble codes and combinations of codes that may be particularly problematic for four-wheel drive vehicles.

The vehicle characteristic database 40 may provide another level of analysis to determine the diagnostic urgency of the vehicle. Thus, if one of the first urgency database 16, second urgency database 18 or vehicle characteristic database 40 outputs a high urgency, then the overall urgency of the vehicle is high urgency. Conversely, if all of the databases 16, 18, 40 output a low urgency (which may simply be the absence of a high urgency output), then the overall urgency is low.

According to one embodiment, the databases 16, 18, 40 are compiled by a network of mechanics 30 (see FIG. 1). The mechanics may continuously update the databases 16, 18, 40 as new vehicles are produced, and as new data is gathered. In this regard, the databases 16, 18, 40 are based on the mechanic's own experience to provide information that is as accurate as possible. Along these lines, one embodiment includes "prior experience" databases 16, 18, 40. The information from the prior experience databases 16, 18, 40 may be prioritized by an urgency prioritizer 32 in accordance with prioritization rules. In general, the urgency prioritization rules may evaluate facts such as whether the of diagnostic trouble codes stored on the databases 16, 18, 40 include the same diagnostic trouble codes received from the vehicle 12; whether the stored combinations of diagnostic trouble codes include additional diagnostic trouble codes, other than diagnostic trouble codes from the vehicle 12; the successful diagnosis associated with each stored combination of diagnostic trouble codes and the associated fix. Evaluation of such factors, in accordance with the scenarios set forth below, allows the identification of a diagnostic urgency associated with the received diagnostic trouble codes.

With the basic structural components of the system 10 described above, the following discussion will focus on the method of determining the urgency status for the vehicle 12. The user disposes the urgency detection tool 14 in communication with the vehicle 12. The communication may be facilitated by wired or wireless means. The diagnostic trouble codes are then downloaded from the vehicle 12 onto the urgency detection tool 14, which communicates the trouble codes to the first urgency database 16 for first order diagnostics. The first urgency database 16 matches each trouble code with an urgency status. The urgency status may be classified as "high" or "low". An urgency status of "middle" may be available in some embodiments. The diagnostic trouble codes are also uploaded to the second urgency database 18 for second order diagnostics. The second urgency database 18 divides the diagnostic trouble codes into separate groups of codes, and assigns an urgency status to each group.

The results from the first urgency database 16 and second urgency database 18 are then communicated back to the urgency detection tool 14 to display the results to the user. In order to have an overall "low" urgency status, all of the results from the first urgency database 16 and second urgency database 18 must be associated with a "low" urgency status. If one of the trouble codes, or groupings of trouble codes are associated with a "high" urgency status, then the overall urgency status is "high". Similarly, if all of the trouble codes, or groupings of trouble codes are associated with a "low" urgency status except for at least one trouble code being associated with an "medium" urgency status, then the overall urgency status is "medium". In this regard, the first and second urgency databases 16, 18 may generate and transmit an urgency command signal to the urgency indicator 28 for communicating the overall urgency status to the user. The urgency command signal may relate to an overall "high" urgency status, a "medium" urgency status, or a "low" urgency status.

The overall urgency status is displayed by the urgency detection tool 14 on the urgency indicator 28. The urgency indicator 28 may include a "high" indicator, a "medium" indicator, and a "low" indicator. The "high" indicator may include a red light, suggesting to the user that the user stop and address the diagnostic condition of the vehicle before continuing to drive the vehicle 12. The "medium" urgency indicator may be associated with a yellow light to suggest to the user to exert caution should the user decide to drive the vehicle 12 before addressing the diagnostic condition. The "low" urgency indicator may be associated with a green light to suggest to the user that the user may proceed without worrying about an urgent diagnostic condition. It is further contemplated that the urgency indicator 28 may only include a single light which communicates the urgency status by varying the brightness of the light emitted therefrom, or the frequency at which the light blinks. In other words, a bright light may correspond to a high urgency, while a dim light may correspond to a low urgency, and vice versa.

The urgency indicator 28 may also produce a sound associated with each urgency status. For instance, the urgency indicator may produce distinguishable alarms for a "high" urgency status, a "medium" urgency status, or a "low" urgency status. The different sounds may be distinguishable based on the type of sound emitted, the frequency of sound emitted, or the loudness of the sound emitted.

The foregoing discussion relates to determining a diagnostic urgency based on diagnostic trouble codes retrieved from the vehicle. Along those lines, certain embodiments were described wherein the diagnostic trouble codes were assigned an urgency status, and thus a diagnostic urgency can be determined based on analyzing the diagnostic trouble codes and comparing them with the assigned urgency status. The following discussion relates to determining a diagnostic urgency using a more conventional diagnostic method, wherein a diagnostic solution is identified, which then allows for identification of replacement or repair parts. Various aspects of the following discussion are direct toward determining an urgency status based on the parts identified in the diagnostic method.

Figure 6:
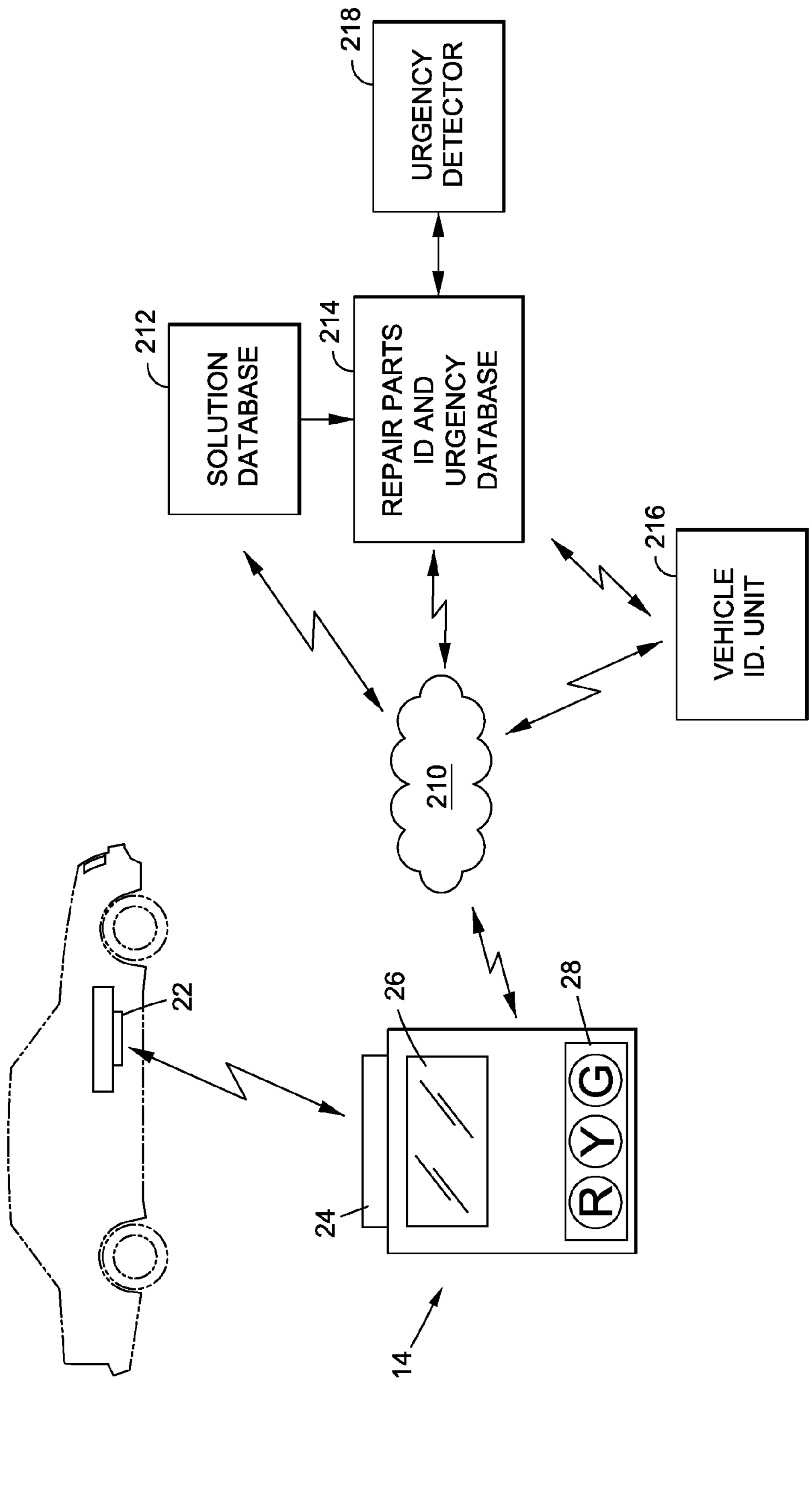
FIG. 6 is a schematic view of a diagnostic urgency detection system constructed in accordance with another embodiment of the present invention.
Figure 7:
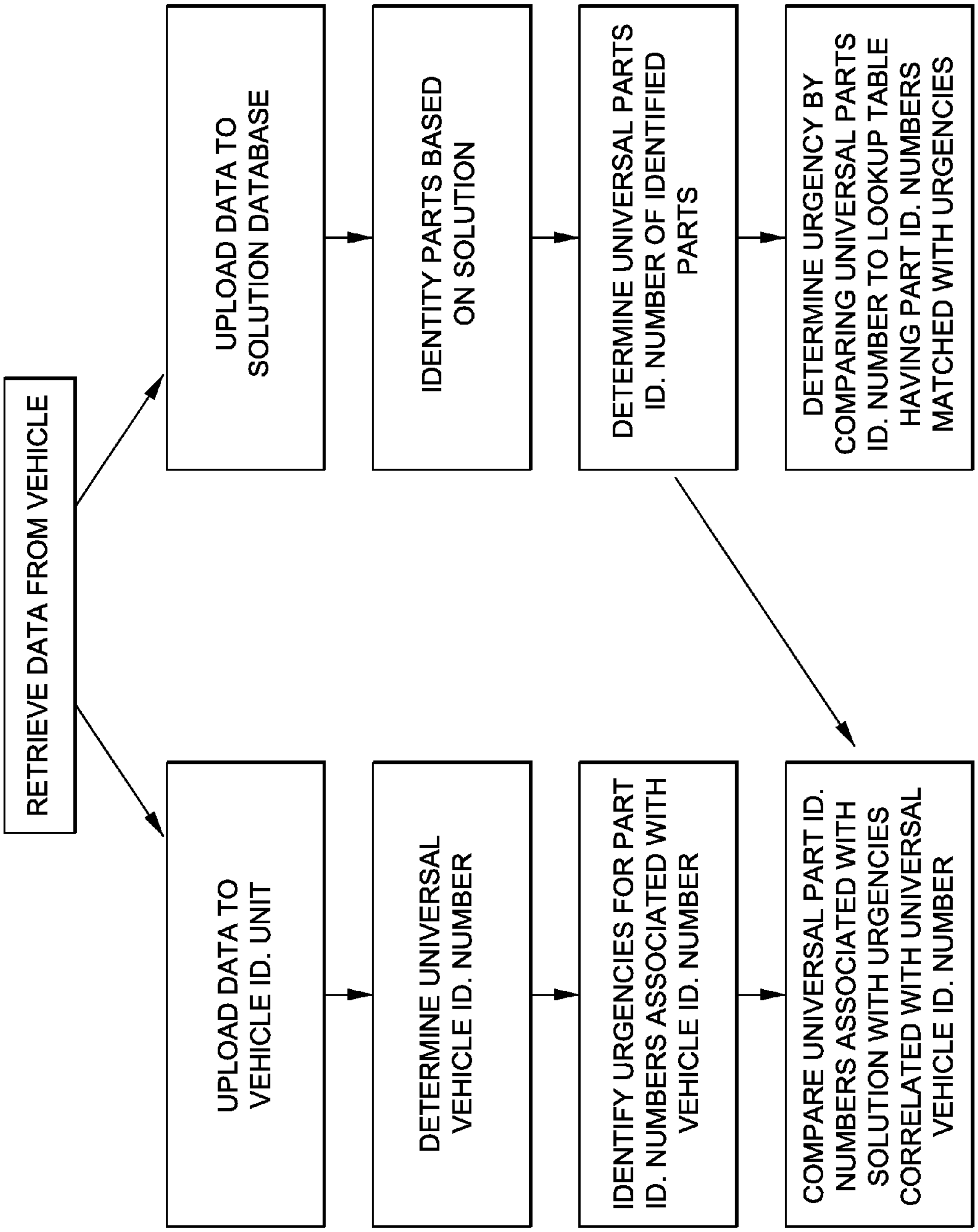
FIG. 7 is a flow chart for determining a diagnostic urgency according to an embodiment of the present invention.

Referring now to FIGS. 6 and 7, a method of determining diagnostic urgency of a vehicle includes connecting an urgency indicator tool or device 14 to the onboard vehicle computer 20 to retrieve data and information therefrom. The data may include diagnostic data, such as DTCs, freeze frame data, and other data commonly retrieved from the onboard computer 20, in addition to vehicle identification information. Such vehicle identification information may include the vehicle identification number (VIN) or alternatively the year, make, model, and engine type of the vehicle. The diagnostic data and vehicle information retrieved from the onboard computer is uploaded to a communications network 210. The uploading of diagnostic data and vehicle information may be facilitated through the use of an intermediate communication device, such as a smart phone, tablet computer, personal computer or other intermediate communication devices known, or later developed, by those skilled in the art. Furthermore, the communication network 210 may include the Internet, a telephone communication network, a local area network, or other communication networks known in the art.

The diagnostic data may be communicated to a solution database 212 from the communication network 210. The solution database 212 is configured to match the diagnostic data with stored solutions to identify a most likely solution that is associated with the uploaded diagnostic data. In some cases, the most likely solution may be as simple as ensuring that the gas cap is properly secured to the vehicle. In other cases, the most likely solution will require a repair part. For instance, the most likely solution may be that a mass airflow sensor needs to be replaced.

When the most likely solution involves a repair part, the most likely solution is communicated to a repair parts identification database 214. The repair parts identification database 214 includes repair parts organized according to vehicle identification information and matched with a universal part identification number. Each universal part identification number is also matched with an urgency status. An example of a universal parts identification system is the Aftermarket Catalog Enhanced Standard (ACES) parts numbering system, although other universally accepted parts identification systems may also be used in connection with the present invention without departing from the spirit and scope of the present invention.

The repair part identified by the most likely solution may be matched with the parts listed in the repair parts identification database to determine the universal part number associated with the repair part. However, it is understood that a given part (e.g., a mass airflow sensor) may vary from one vehicle to the next. Accordingly, there may be several universal part identification numbers associated with the different mass airflow sensors. As such, in order to identify a specific mass airflow sensor that is adapted for use with a specific vehicle, vehicle identification information is required. As such, the repair parts identification database 214 may receive that vehicle identification information as part of the upload from the tool 14. Alternatively, the repair parts identification database 214 may receive a universal vehicle identification number from a vehicle identification unit 216, as will be explained in more detail below.

An urgency detector 218 determines the diagnostic urgency based on the universal part identification number associated with the most likely solution. In this respect, the repair parts identification database 214 may be organized such that each universal part identification number is correlated to an urgency status. Once the urgency status is identified, a signal may be communicated back the urgency detection tool 14 for display of the urgency status as described in more detail above.

It is also contemplated that in addition to parts being assigned universal identification numbers, vehicles may also be assigned a universal vehicle identification number, which corresponds to vehicles having the same year, make, model, and engine type. Thus, once a vehicle has been identified, the specific parts used on that vehicle may also be identified. Consequently, each universal vehicle identification number will be associated with various universal part identification numbers. When the vehicle under consideration has been identified, the universal part numbers associated with the vehicle may be focused on to simplify the analysis. Therefore, the searching for the diagnostic urgency may be simplified once the universal vehicle identification number is known because it will define a limited number of universal part identification numbers which can be searched.

Figure 8:
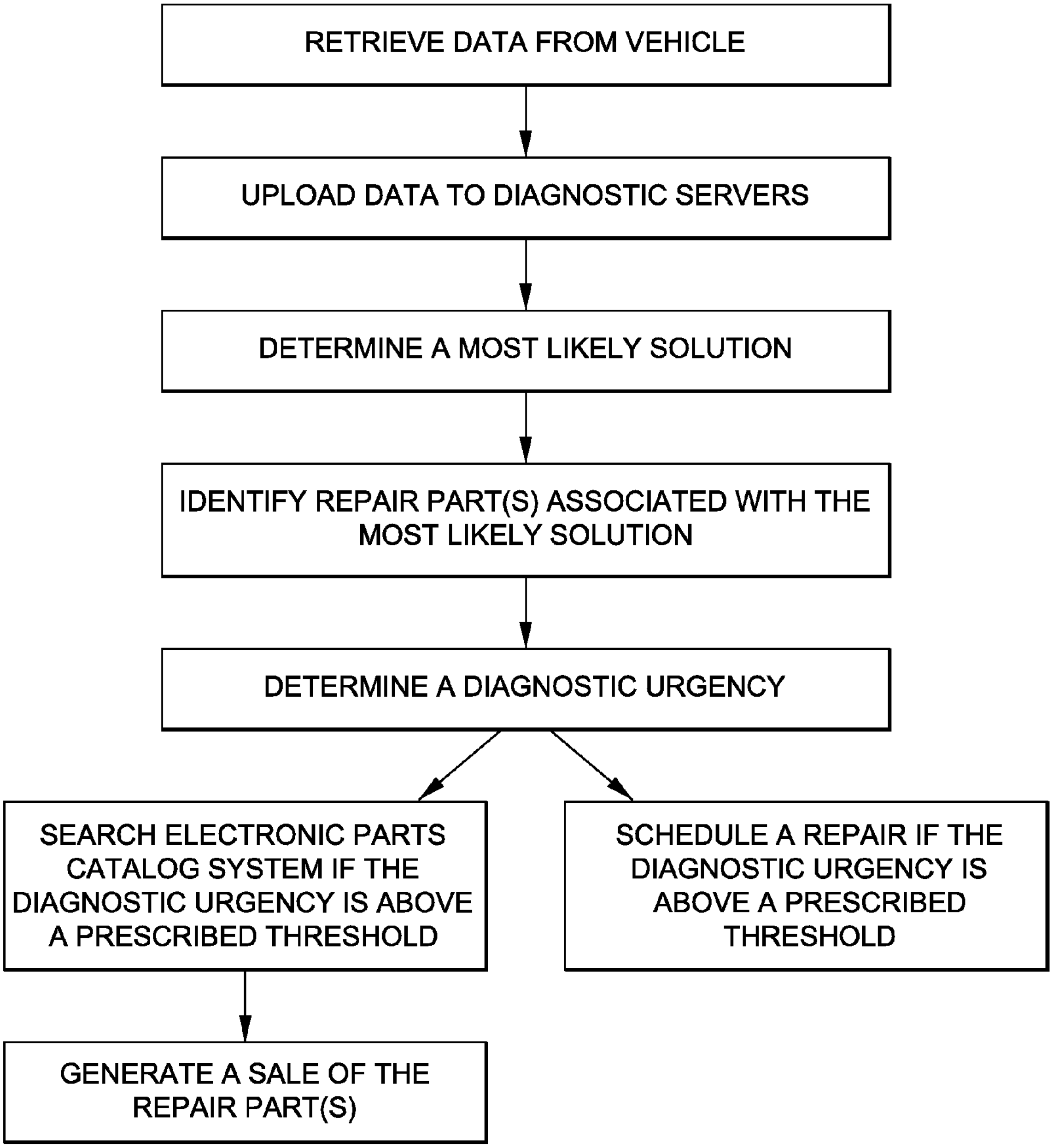
FIG. 8 is a flow chart illustrating an e-commerce application of the present invention.
Figure 9:
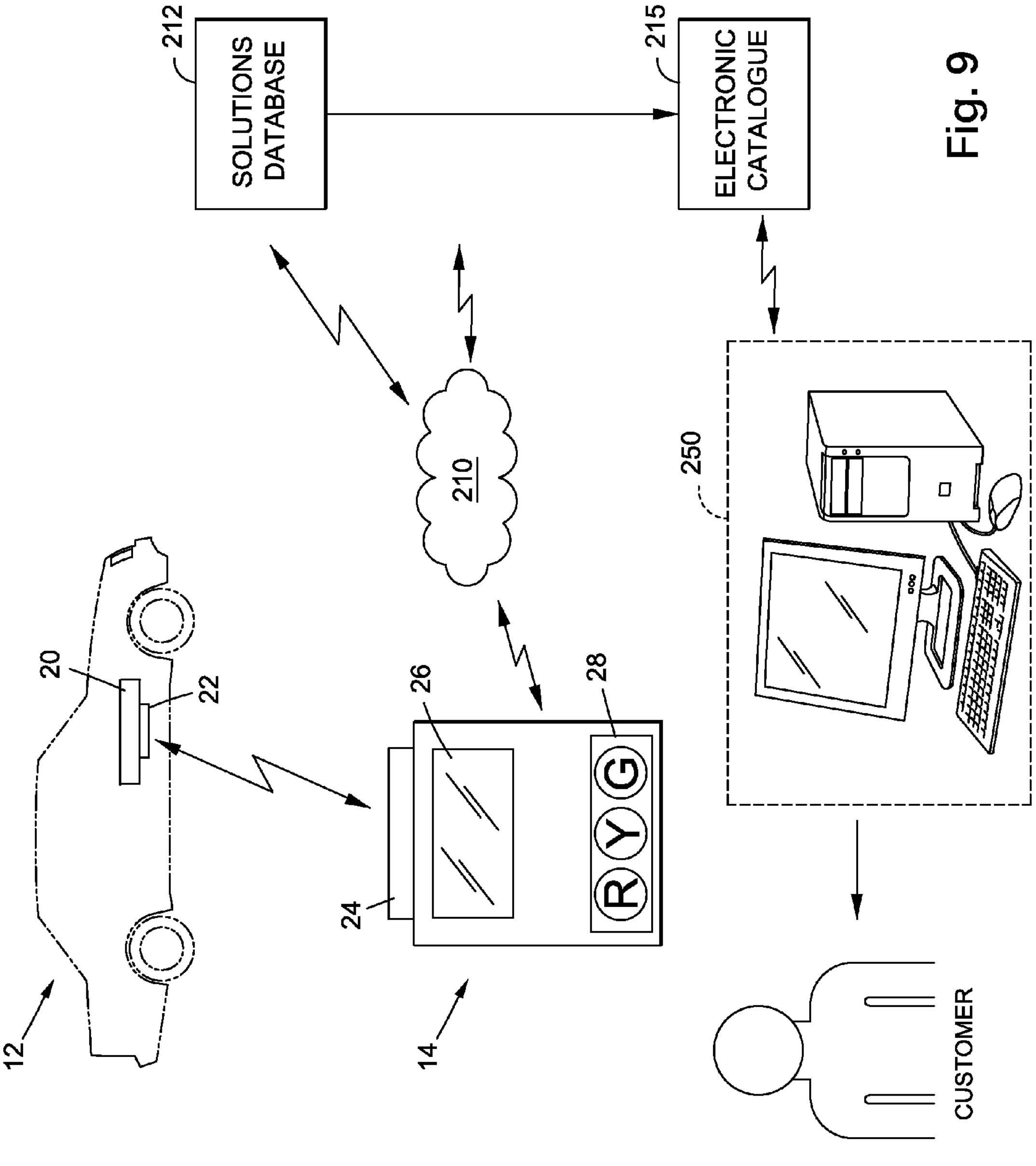
FIG. 9 is a schematic view illustrating an e-commerce system constructed in accordance with an aspect of the present invention.

Referring now to FIGS. 8 and 9, the diagnostic urgency detection methods described herein may be useful in various e-commerce applications. For instance, when the system determines that a repair is above a prescribed threshold (e.g., a high urgency status), the system may take steps to quickly effectuate the repair. One particular aspect of the system is that certain steps in the overall process may proceed automatically, without any input from the user, thereby reducing the burden on the user.

According to one embodiment, diagnostic data (e.g., DTCs) may be automatically uploaded from the tool 14 to a diagnostic database, such as the solution database 212. The upload of diagnostic data may be completed through the use of an intermediate device, such as a cellphone, or the tool 14 may include onboard hardware capable of uploading the information directly. The data may be uploaded in response to a command entered by the user (e.g., the user actuating a button on the tool 14 or a linked device, such as a smartphone), or in response to a predefined triggering condition. For instance, the tool 14 may be associated with a particular parts store 250 such that when the vehicle 12 (having the tool 14 plugged into the vehicle 12) enters a predefined area around the parts store 250, such as the parking lot, the tool 14 automatically uploads the information to the diagnostic databases 212 associated with the parts store 250. The triggering condition is not limited to the tool 14 moving into a predefined area around the parts store 250. Rather, the predefined triggering condition may also include one of the following: the tool 14 being in wireless communication with a predefined wireless network (e.g., public or private Internet access), the tool 14 moving into a predefined area around a service garage, the tool 14 returning home or to a garage, the engine being turned ON, the engine being turned OFF, a DTC being generated by the vehicle. Of course, those skilled in the art will appreciate that the aforementioned triggering conditions are exemplary in nature only, and are not intended to limit the scope of the present invention. Along these lines, other triggering conditions known in the art may also be used without departing from the spirit and scope of the present invention.

Once the information from the vehicle 12 is uploaded to the diagnostic databases 212, a most likely solution is determined, along with a corresponding repair part. As with the upload of diagnostic information to the database 212, the analysis of the diagnostic information at the database 212 may be completed automatically without input from the user. Based on that diagnostic analysis, an urgency status is determined, and depending on the system, the urgency status may be low, medium or high.

In the event the determined diagnostic urgency is above a prescribed threshold, the system may automatically complete the sale of the repair part to expedite the repair. The threshold may be determined by the user. In some instance, the user may only want to purchase the part if the urgency is high, while in other instances, the user may want to purchase the part if the urgency is high or medium, while in yet further instances, the user may want to purchase the part regardless of the determined urgency (e.g., the part may be purchased if the urgency is low, medium or high).

The process of completing the sale of the repair part may include establishing a link between the diagnostic database 212 and an electronically searchable parts catalog or database 215 to determine if the parts store 250 carries the specific repair part needed (e.g., the repair part associated with the specific part number), if the repair part is in stock, as well as determining the price of the repair part. The search of the parts database 215 may be completed automatically without any input from the user. It is contemplated that a plurality of parts databases 215 associated with different parts stores may be searched to find the nearest repair part and/or the least expensive repair part.

The system may be configured to automatically ship the part to the user to allow the user to complete the repair. Alternatively, the part may be set aside for the user at the parts store for pickup. In other embodiments, the sale of the part may not be completed until the user arrives at the store. The user may be sent part tracking information to enable quick and easy completion of the sale once the user arrives at the store. For instance, the system may send an email and/or text message to the user with a reference number, tracking number, bar code, or other transaction identification information to simplify the sale when the user arrives at the store. The part information may also be displayed for the customer at the parts store to allow the customer to visually confirm the information prior to purchase.

In addition to automatically generating a sale of the part, the system may also automatically schedule a repair to install the new repair part. The automatic scheduling of the repair may be particularly useful in fleet management applications. When a repair is automatically scheduled, the user/fleet manager may be sent a message with details associated with the repair, such as the date/time of the repair, estimate time to complete the repair, cost of the parts/service, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of identifying an urgency of treating a diagnostic condition of a specific vehicle, the vehicle including an on-board computer having a diagnostic data and vehicle identification information stored thereon, the method comprising the steps of:

identifying at least one most likely solution based on the diagnostic data retrieved from the on-board computer, wherein the most likely solution is identified in relation to the data retrieved from the on-board computer considered separately and wherein combinations of the data retrieved from the vehicle considered collectively;

after identifying each most likely solution, identifying a repair part(s) associated with each identified most likely solution for the vehicle, the identified repair part(s) being associated with a universal part number;

providing an urgency database having a plurality of universal part numbers, wherein each universal part number is associated with a one of a low urgency and a high urgency;

after identifying the repair part(s) associated with each most likely solution, comparing the universal part number associated with the repair part to information stored in the first urgency database to determine an urgency status associated with the repair part(s); and generating a high urgency indicator signal in response to a high urgency status resulting from comparison of the universal part number to the urgency database.

2. The method recited in claim 1, wherein the providing step includes providing an urgency database having a plurality of Aftermarket Catalog Enhanced Standard (ACES) part numbers associated with one of the low urgency and the high urgency.

3. The method recited in claim 1, wherein the step of identifying a repair part(s) includes an assessment of the vehicle identification information.

4. The method recited in claim 1, further comprising the step of automatically searching an electronic part catalog system for the repair part(s) when the repair part(s) is associated with a prescribed urgency.

5. The method recited in claim 4, wherein the prescribed urgency is a high urgency.

6. The method recited in claim 1, further comprising the step of scheduling a repair when the repair part(s) is associated with a prescribed urgency.

7. The method recited in claim 1, further comprising the step of generating a sale of the repair part(s) when the repair part(s) is associated with a prescribed urgency.

8. The method recited in claim 1, further comprising the step of providing an urgency indicator configured to emit a high urgency alert signal in response to generation of the high urgency indicator signal.

9. The method recited in claim 1, further comprising the step of generating a low urgency indicator signal in response to a low urgency status resulting from comparison of the universal part number to the urgency database.

10. A method of identifying an urgency of treating a diagnostic condition of a specific vehicle, the vehicle including an on-board computer having diagnostic data and vehicle identification information stored therein, the diagnostic data being associated with a most likely diagnostic solution, the method comprising the steps of:

forming a first urgency database listing a plurality of universal part numbers, wherein each part number is associated with a respective first urgency status, the first urgency status being one of a low urgency and a high urgency;

identifying a repair part having a part number, the repair part being associated with the most likely diagnostic solution for the vehicle;

after identifying the repair part(s) associated with the most likely diagnostic solution, determining a first urgency status by comparing the part number of the repair part to information stored in the first urgency database; and generating a high urgency indicator signal in response to high urgency status resulting from comparison of the part number to the first diagnostic database.

11. The method recited in claim 10, wherein the forming step includes forming a first urgency database having a plurality of Aftermarket Catalog Enhanced Standard (ACES) part numbers associated with a respective first urgency status.

12. The method recited in claim 10, wherein the step of identifying a repair part includes an assessment of the vehicle identification information.

13. The method recited in claim 10, further comprising the step of automatically searching an electronic part catalog system for the repair part when the repair part is associated with a prescribed urgency.

14. The method recited in claim 13, wherein the prescribed urgency is a high urgency.

15. The method recited in claim 10, further comprising the step of scheduling a repair when the repair part is associated with a prescribed urgency.

16. The method recited in claim 10, further comprising the step of providing an urgency indicator configured to emit a high urgency alert signal in response to generation of the high urgency indicator signal.

* * * * *